(No Model.) 2 Sheets—Sheet 1.

L. G. SAYRE.
TWO WHEELED VEHICLE.

No. 281,304. Patented July 17, 1883.

Attest:
E. R. Hill
W. P. Gulick

Inventor:
Lewis G. Sayre
per Wm. Hubbell Fisher
Atty (No Model.) 2 Sheets—Sheet 2.
L. G. SAYRE.
TWO WHEELED VEHICLE.
No. 281,304. Patented July 17, 1883.
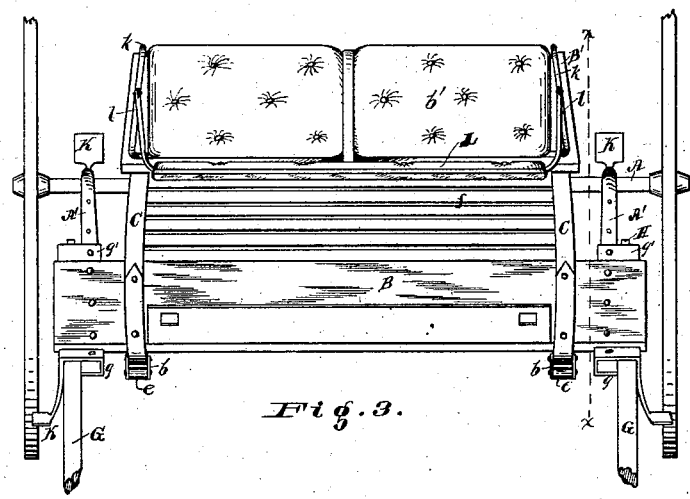
Fig. 3.
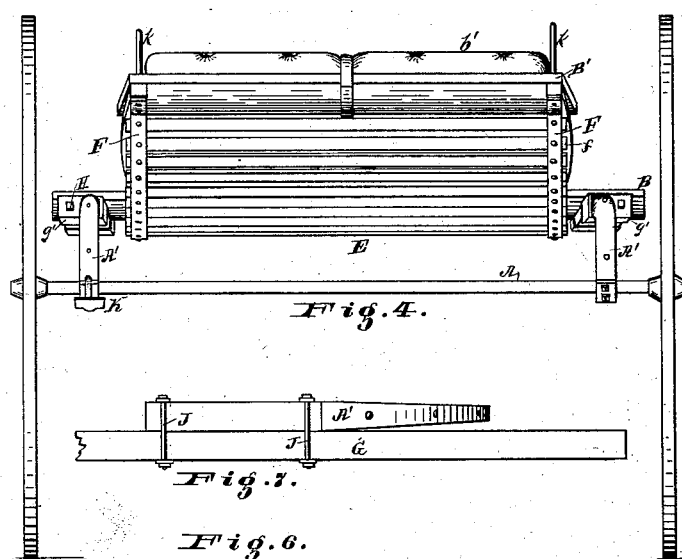
Fig. 4.
Fig. 7.
Fig. 6.
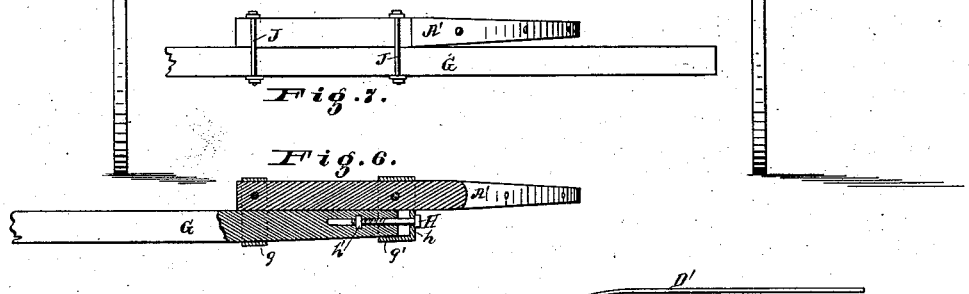
Fig. 5.
Attest:
E. R. Hill
H. P. Gulick
Inventor:
Lewis G. Sayre
per Wm. Hubbell Fisher
Atty.

UNITED STATES PATENT OFFICE.

LEWIS G. SAYRE, OF MOUNT HEALTHY, OHIO.

TWO-WHEELED VEHICLE.

SPECIFICATION forming part of Letters Patent No. 281,304, dated July 17, 1883.

Application filed December 11, 1882. (No model.)

*To all whom it may concern:*

Be it known that I, LEWIS G. SAYRE, of Mount Healthy, in the county of Hamilton and State of Ohio, have invented certain new and useful Improvements in Vehicles, of which the following is a specification.

One of the principal features of my invention relates to a new and useful spring for sustaining a portion or the whole of the weight of the vehicle body or seat, as the case may be.

For the purpose of illustrating the various features of my invention, I shall proceed to describe them as applied to a two-wheeled vehicle.

Figure 1:
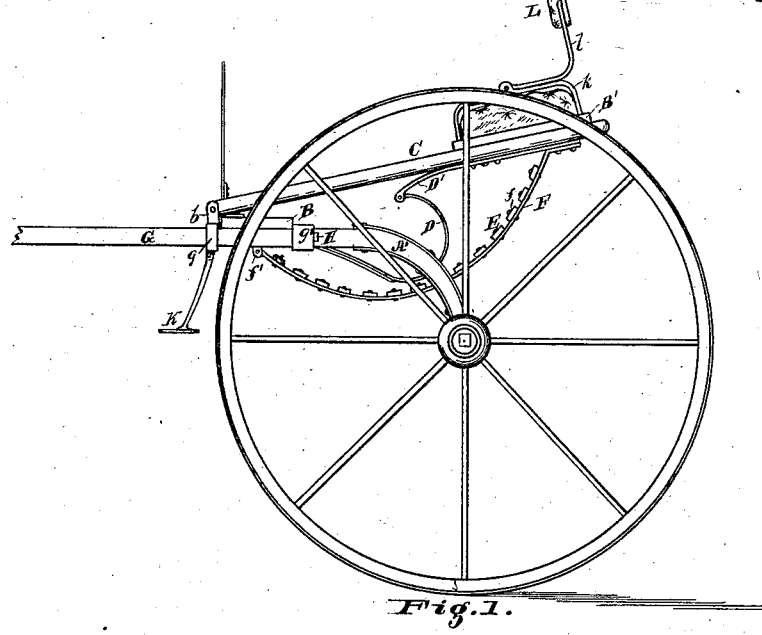
Figure 2:
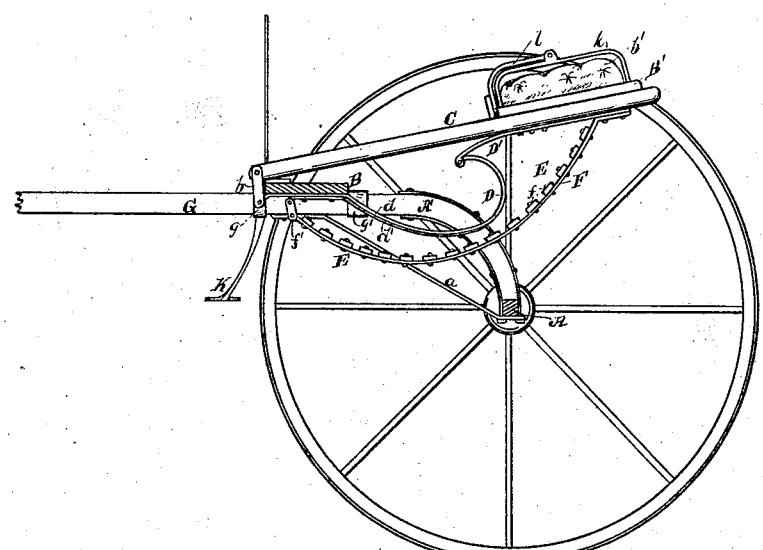

Referring to the drawings forming part of this specification, Figure 1 is a side elevation of a vehicle, showing one mode of applying the features of my invention. Fig. 2 is a sectional elevation, the section being taken at the dotted line $x\ x$ of Fig. 3, and the spectator looking toward that side of the vehicle which is on the left-hand side in Fig. 3. Fig. 3 is a top perspective view of the vehicle. Fig. 4 is a rear perspective elevation of the same. Fig. 5 is an enlarged view of the spring, which is one of the features of my present invention. Figs. 6 and 7 represent two different methods of connecting the thills to the vehicle.

To the axle A are rigidly connected the rear ends of the brackets A', the front ends of which are connected by the foot-board or platform B, this platform being rigidly secured by bolts or otherwise to the brackets. These brackets are preferably curved, as shown. For the purpose of strengthening the bracket and enabling the latter to better resist the pulling strain to which it is subjected, a suitable brace, $a$, secured to the axle, extends from the latter to the forward portion of each of the brackets, and is there also secured to the latter.

At each side of the vehicle is a seat-bar, C. The forward end of each bar is pivoted in front of the platform B by means of a link, $b$, or other suitable pivotal connection, which will allow the rear ends of said bars to be raised and lowered, and to the rear ends of these bars C is secured the seat-board B', upon which is placed a suitable seat or cushion, as $b'$.

To the under side of the platform B are rigidly attached the front ends of the springs D, one near each side of the vehicle. These springs D are curved, as shown, the rear ends being curved up to within a short distance below the bars C. To the under side of the bars C, below the seat B, are secured the additional springs D', the forward ends of which are curved away from the bars, and are connected to the rear ends of the springs D. Spring D, in connection with spring D', makes a continuous compound spring for the support of the superincumbent weight to which they are subjected. The spring D may consist of any desired number of leaves and of any desired strength. Preferably it consists of an upper main leaf, $d$, (see Fig. 5,) and a supplemental leaf, $d'$, and the forward end of the leaf $d$ is preferably formed into an eye, $e$, to which the lower end of the link $b$ is connected when present; but if these links be omitted, and the forward ends of the bars C otherwise pivoted, the eyes $e$ need not be present.

Below the seat and the bars C is a suitable foot support or bottom. For the reasons hereinafter mentioned this bottom is preferably of the form indicated by E in the drawings, and is as follows: This crib or bottom E consists of a number of slats, $f$, bolted or screwed at each end to a spring, F, the rear ends of which are bolted to the bars C below the seat, and the forward ends are connected to the under side of the platform B or forward part of the frame.

In order to more readily connect the forward end of the spring F to the forward end of the frame and detach said end therefrom, I preferably employ the links $f'$, in which event I connect one end of the link $f'$ to the end of the spring F, and the other end of said link to the forward end of the frame. A convenient mode of making the last-named connection consists in forming the end of the supplemental leaf $d'$, when present, of spring D into an eye, $e'$, and to the latter the upper end of the link $f'$ is secured. The link $f'$ is preferably secured to the eye $e'$, so as to be rigid therewith, and thus enable the spring F to operate more fully than it would if the link $f'$ were free to oscillate.

When a person enters the vehicle, the rear ends of the bars C, carrying the seat B', are depressed, the springs D D' permitting this motion, and as the seat is depressed the spring-bars F of the crib E will be bent, and will thus act as an additional spring. The springs D D' also operate as a brace for the spring-bars. The thills G are connected to the brackets A', preferably in the manner shown in Fig. 6. A loop, g, passes around the front end of each bracket and around the branch of the thill at that side, and back of this loop g is another loop, g', also passing around the bracket and the thill, and these loops are both bolted to the bracket. The end of the thill is tapered from a point a little in front of the loop g, so that the farther the thill is caused to pass through the loop the tighter it will be. The rear of the loop g' is closed by a plate, h, or a separate washer, and through this plate or washer is passed a bolt, H, which bolt enters the end of the thill, in which latter is secured a nut, h', into which the end of the bolt H is screwed. As the bolt H is screwed into the end of the thill G the latter is drawn tightly into the loops g g', and is therefore held firmly in position and prevented from rattling; and should the thill wear loose and rattle, it may easily be tightened by simply turning the bolt H.

When the vehicle is to be used for training unruly colts or vicious kicking horses, or when for any other reason it is desirable to have the horse removed farther from the vehicle than shafts of ordinary length will permit, the driver may make one pair of shafts do the work of long or short shafts. This single pair of shafts may be made of the extra length required for long shafts. A very convenient mode of attaching such shafts to the brackets A' is shown in Fig. 7, and is as follows: Clamps J are passed around the bracket and the thill, and when these clamps are tightened the thills are held firmly in position. Thus, by loosening the clamps and bringing the shafts forward and tightening the clamps, the full length of these shafts can be utilized in driving vicious horses, and when their extra length is not required, the clamps being loosened, they can be carried backward the desired distance. The clamps J now being tightened, the shafts will serve as ordinary ones. The rear ends of the shafts will extend backwardly beyond the brackets, as shown in Fig. 7.

When the driver has two pair of shafts— viz., a pair of ordinary length and another pair of extra length—these can be in turn attached to the brackets by means of the clamps J; but I prefer in such case to employ the device shown in Fig. 6, as the same is a very simple, convenient, and efficacious one.

The vehicle may be used for a double team, and when so used may have a couple of loops, g g', connected to the under side of the center of the frame, and to these (the shafts being removed) a tongue may be connected, the latter being slipped into the loops and held in place by the device shown in Fig. 6.

The vehicle is provided with the necessary steps K, which may be located either in front or rear or both. The seat B' is provided with a "lazy-back," L, which is secured to angular arms l, the ends of which are pivoted to brackets k, connected to the seat at or near the ends of the latter. When it is not desired to use this lazy-back, it is turned forward, as shown in Figs. 2 and 3, resting against the front of the seat, where it is entirely out of the way, and does not interfere with the seat, and when it is desired to use this lazy-back it may readily be turned up, as shown in Fig. 1, without disturbing the cushion.

The bracket k may be of any suitable design. The preferred kind is, as shown, a rail of semicircular form, the angular arm l of the lazy-back being pivoted to the rail at or near the center of the latter, the rail serving also as a guard to prevent the person sitting on the seat from slipping off the end of the latter.

The various features of my invention, as above described, are preferably employed in connection with each other; but, if desired, certain one or more of these features may be employed independently of the others, so far as applicable to other vehicles.

The compound spring D D' is applicable in various positions to vehicles having more than two wheels, and to side-bar vehicles. Where the compound spring D D' is applied in place of the ordinary end elliptic spring parallel to the axle, a pair of these compound springs is to be used over the axle and parallel thereto.

Obviously the devices shown in Figs. 6 and 7 are applicable to any vehicles having brackets A'.

Having thus described my invention, what I claim as new, and desire to secure by Letters Patent, is as follows:

1. In a two-wheeled vehicle, the seat resting on spring-bars pivoted at their front ends, and supported by curved double springs, as D D', said springs being fastened at one end to a stationary support and at the other to the pivoted spring-bar, substantially as and for the purposes specified.

2. In a two-wheeled vehicle, the seat B', secured to the bars C, the front ends of said bars being pivoted or hinged to the platform B, in combination with the curved double springs D D', secured to said platform and bars, and the crib E, rigidly connected at one end to the bars C, and at the other end connected to the platform, substantially as and for the purposes specified.

3. The seat-bars C, pivoted at their forward ends to the platform B, and supported by the double curved springs D D', in combination with the crib E, consisting of the spring-bars F and slats f, said spring-bars being rigidly attached at their rear ends to the bars C, their forward ends being connected to the platform B by means of links f', substantially as and for the purposes specified.

4. The herein-described spring, consisting of the elongated C portion D and the curved extension D', connected thereto, substantially as and for the purposes specified.

5. In combination with a vehicle, the curved spring-extension D' and the elongated C-spring D, the latter being re-enforced by the leaf d', lying alongside the straight portion of spring D, and along a portion of the curved part of the latter, substantially as and for the purposes specified.

6. In combination, the spring D' D, the latter provided at one end with the eye e, and secured to a fixed part of the vehicle, and the spring-bar C, and link b, connecting the hinge end of the spring-bar and the eye e, substantially as and for the purposes specified.

7. In combination, the spring D' D, the latter provided at one end with the eye e, and secured to a fixed part of the vehicle, and further provided with a re-enforcing leaf d', having eye e', and the spring-bar connected at its hinged end to the eye e by means of the pivotal link b, and spring F, connected at one end to eye e' by the link-connection f', substantially as and for the purposes specified.

LEWIS G. SAYRE.

Witnesses:
J. WM. STREHLI,
E. R. HILL.